United States Patent [19]

Fisher

[11] 4,341,987

[45] Jul. 27, 1982

[54] TWO-SPEED SINGLE PHASE MOTOR WITH CENTRIFUGAL SWITCH

[75] Inventor: Lynn E. Fisher, Fort Wayne, Ind.

[73] Assignee: General Electric Company, Fort Wayne, Ind.

[21] Appl. No.: 187,758

[22] Filed: Sep. 16, 1980

[51] Int. Cl.³ .............................................. H02D 5/40
[52] U.S. Cl. ................................... 318/774; 310/782; 310/785; 310/793
[58] Field of Search ............... 318/772, 774, 785, 782, 318/793

[56] References Cited

U.S. PATENT DOCUMENTS

| | | | |
|---|---|---|---|
| 2,743,406 | 4/1956 | London | 318/743 |
| 2,774,924 | 12/1956 | Witt | 318/774 |
| 3,044,001 | 7/1962 | Roller | 318/782 |
| 3,368,130 | 2/1968 | Bussone | 318/740 |
| 3,368,131 | 2/1968 | Ross | 318/774 |

Primary Examiner—Gene Z. Rubinson
Attorney, Agent, or Firm—Joseph E. Papin

[57] ABSTRACT

A two-speed single phase motor of the capacitor-start type is disclosed wherein the motor is switched from the start condition to the run condition by means of a single contact centrifugally actuated switch. The motor comprises high speed and low speed main windings and a start winding employed in both the high speed and low speed configurations. A single pole single throw centrifugally actuated switch connected to the rotor has a single contact pair which opens when the motor exceeds a predetermined speed, and the same contact pair is used in both the high speed and low speed configurations. A relay comprising a coil in series with the centrifugal switch contacts has a pair of normally open contacts in series with the start capacitor so that when the centrifugal switch contacts open and interrupt the flow of current through the relay coil, the relay contacts will open thereby disconnecting the start capacitor from the circuit. A double throw selector switch having a high speed position and an alternative low speed position connects the centrifugal switch contacts and the relay coil in series either with the low speed main winding or the high speed main winding so that the low speed winding is disconnected upon reaching run conditions when the selector switch is in the high speed position, and the high speed main winding is disconnected upon reaching run conditions when the selector switch is in the low speed position. A run capacitor may be connected in series with the start winding, preferably in parallel with the start capacitor and the relay contacts.

13 Claims, 1 Drawing Figure

TWO-SPEED SINGLE PHASE MOTOR WITH CENTRIFUGAL SWITCH

BACKGROUND OF THE INVENTION

The present invention relates generally to single phase electric motors, and in particular to multiple speed capacitor start motors which are switched from the start condition to the run condition by means of a centrifugal switch.

The typical single phase capacitor start motor has a main and auxiliary or start winding wherein the start winding is spatially displaced from the main winding, usually by an angle of ninety electrical degrees. The start winding is connected in series with a start capacitor, which is generally utilized only during starting conditions of the motor. In order to develop starting torque, it is necessary that the currents in the main and start windings be displaced in time phase, and the capacitor, which causes the start phase current to lead the main phase voltage, is utilized for this purpose.

In order to achieve favorable torque characteristics and to prevent damage to the capacitor at full operating speeds of the motor, it is necessary to switch the start capacitor out of the circuit when the rotor has exceeded a predetermined speed. The most popular device for switching out the start capacitor in fractional horsepower motors is the centrifugal switch. A switch of this type comprises a centrifugal device generally mounted on the rotor shaft, and as the rotor increases in rotational speed, centrifugal force actuates a mechanism which causes a collar to move in the axial direction. The collar engages a switch operating arm carrying one or more contact pairs, and when the arm is moved axially, the contact pairs are opened. This disconnects the start capacitor from the circuit thereby enabling the motor to run at operating speed with its maximum torque and without damage to the capacitor. If desired, the centrifugal switch may also disconnect the start winding from its circuit. Centrifugal switches of the above and other types are available from a wide variety of manufacturers, such as the General Electric Company.

In order to enable the motor to operate at two speeds, it may be provided with two main windings, one for each speed, and one or two start windings. In some cases, it is desirable to utilize a single start winding for both high speed and low speed operation, whereas in other applications, separate start windings, one for each speed, are employed. In pole-changing motors, the low speed main winding has a larger pole configuration than the high speed winding, for example, a four pole winding for low speed and a two pole winding for high speed. Typically, the centrifugal switch for a two-speed motor of this type would have a plurality of contact pairs on the switch operating arm if the same switch is used in both the high speed and low speed configurations.

Two-speed capacitor-start motors have been utilized in a wide variety of applications, such as fan and pump drives. One particular application of such motors which has proved troublesome is in swimming pool filter pumps. Generally, it is desirable to run such pumps at two speeds, the high speed operation being used when activity in the pool is the greatest and more water per unit time is to be filtered, and low speed operation when the pool is empty and not as much water circulation is necessary.

One of the problems with this type of installation is that the motor and pump are normally installed in or above the pool deck so that the motor is exposed to the environment. In sandy environments, such as around pools that are located at or near beach areas, blowing sand often becomes lodged between the contacts of the centrifugal switch thereby preventing closure of the contacts during starting of the motor. Because a centrifugal switch is actuated by a mechanical linkage connected between it and the rotor, it is very difficult to shield the switch from the environment. Although a running seal obtained by providing baffles separating the switch compartment from the rest of the motor have been utilized in the past, this has not proven entirely satisfactory, and is expensive to manufacture and assemble.

A technique which has been used to protect a single contact pair of a centrifugal switch is to install a rubber boot around it. Although this is satisfactory in motors where the centrifugal switch only opens a single contact pair, it is not feasible in the case of prior art two-speed motors of the type in question wherein three contact pairs are spatially separated on the Y-shaped switch operating arm. Fabricating a boot which would protect all three contact pairs would be expensive to manufacture and difficult to assembly on the motor during manufacturing thereof. The problem to be overcome, then, is to design a two-speed motor which utilizes a single start capacitor and a single centrifugal switch having only one contact pair common to both the high speed and low speed configurations. This will enable the use of a single rubber boot enveloping the centrifugal switch single contact pair thereby protecting the same from blowing sand, rain, and other adverse environmental conditions. Additionally, it is desirable that the motor so designed to accommodate a single pole single throw centrifugal switch has the desired range of speed control and is efficient both in operation and from a manufacturing standpoint.

One such solution to this problem is disclosed in co-pending application Ser. No. 187757, filed Sept. 16, 1980 of S. London and owned by the assignee of the present application. The motor comprises high speed and low speed main windings and high speed and low speed start windings wound on the stator core and a double throw selector switch for connecting the high speed main and start windings to the terminals or the low speed main and start windings to the terminals when the motors operate in the high speed and low speed configurations, respectively. A single pole single throw centrifugal switch has a single contact pair connected in series with the start capacitor and one of the terminals, and the switch contacts open when the rotor exceeds a predetermined rotational speed to disconnect the start capacitor from the circuit. If a run capacitor is not used, the centrifugal switch disconnects the start winding from the circuit in both the high speed and low speed configurations.

It is an object of the present invention to provide a multiple speed single phase motor of the capacitor start variety that utilizes a single centrifugal switch having a single pole single throw contact pair for both high speed and low speed operation, thereby facilitating booting of the contacts.

It is a further object of the present invention to provide a single phase multiple speed motor of the capacitor-start variety wherein a single start winding can be utilized in both the high speed and low speed configurations.

It is a further object of the present invention to provide a single phase multiple speed motor of the capacitor-start variety wherein the speed of the motor can be accurately selected and controlled.

A still further object of the present invention is to provide a single phase multiple speed induction motor of the capacitor-start type wherein the available separation between the low and high speeds is great, and wherein a variety of motors having different speed ratios can be manufactured with the same basic design by varying only the pole configurations of the windings.

Another object of the present invention is to provide a single phase multiple speed motor of the capacitor-start variety wherein there is an efficient utilization of copper in the main and start windings, and wherein the motor will operate efficiently.

Yet another object of the present invention is to provide a capacitor-start single phase motor capable of running at at least two different speeds by switching in main windings of varying pole configuration.

Yet another object of the present invention is to provide a two-speed capacitor-start single phase motor wherein both the high speed and low speed main windings and the start winding are activated during start conditions of the motor, and wherein one of the main windings is disconnected from the circuit when the run condition has been attained.

SUMMARY OF THE INVENTION

The problem of sand, insects and other foreign matter becoming lodged between the contacts of the centrifugal switch is overcome by the present invention wherein switching out of the start capacitor is achieved by a relay in combination with a single pole single throw centrifugal switch, which has contacts that can easily be protected by enveloping them in a rubber boot. The relay contacts, since they are actuated by current flowing through the coil and not by a mechanical connection with the rotor, can be completely encased, as in the case of conventional current-operated motor relays presently in wide use. Although both the high speed and low speed main windings are activated during the start condition of the motor, the selector switch causes the high speed main winding to be disconnected from the circuit when the centrifugal switch contacts open upon attaining running speed. This also disconnects the start winding and run capacitor from the circuit. In the high speed mode, opening of the centrifugal switch contacts disconnects the low speed main winding and causes the relay contacts to disconnect the start capacitor from the circuit. The start winding remains in the circuit due to the presence of the run capacitor, but if this capacitor were deleted, the start winding would also be deactivated upon attaining running speed.

The use of different main windings having a higher number of poles and a lower number of poles for low speed and high speed operation, respectively, results in the motor having a wider variation between the high and low speeds, and permits more accurate control of the speed. Additionally, the motor is efficient in operation and there is an efficient utilization of copper in forming the windings.

In the case of larger horsepower motors, it is desirable to utilize a run capacitor at least in the high speed configuration, and perhaps also in the low speed configuration. In accordance with the present invention, a run capacitor is connected in the circuit during start conditions in both the high speed and low speed modes, but remains in the circuit during run conditions in the high speed mode only.

In the preferred embodiment of the present invention, the low speed main winding is of four pole configuration and both the high speed main and start windings are of two pole configuration. Even in the low speed configuration, wherein the two pole start winding does not match the four pole main winding, the magnetic fields produced by the two windings will add until the synchronous speed of the four pole main winding is reached. It is then desirable to switch the start winding out, and this is accomplished by selecting the switching speed of the centrifugal switch at or near the synchronous speed of the four pole main winding.

Specifically, the present invention contemplates a multiple speed capacitor start induction motor comprising a stator core, a rotor rotatable within the stator core, a pair of terminals connectible to a source of excitation voltage, high and low speed main windings wound on the core and connected across the terminals, a start winding wound on the core and connected across the terminals, and a start capacitor connected in series with the start winding. A single pole centrifugally actuated switch responsive to the rotational speed of the rotor has a pair of switch contacts which open when the rotor exceeds a predetermined speed, and these are connected in series with the coil of a relay having contacts in series with the start capacitor. The relay contacts open when current through the coil is interrupted by the opening of the series connected speed actuated switch contacts. A double throw selector switch having a high speed position and an alternative low speed position connects the centrifugally actuated switch contacts in series with the low speed main winding and one of the terminals when in the high speed position, and connects the centrifugally actuated switch contacts in series with the high speed main winding and one of the terminals when in its low speed position.

DESCRIPTION OF THE PREFERRED EMBODIMENT

Figure 1:
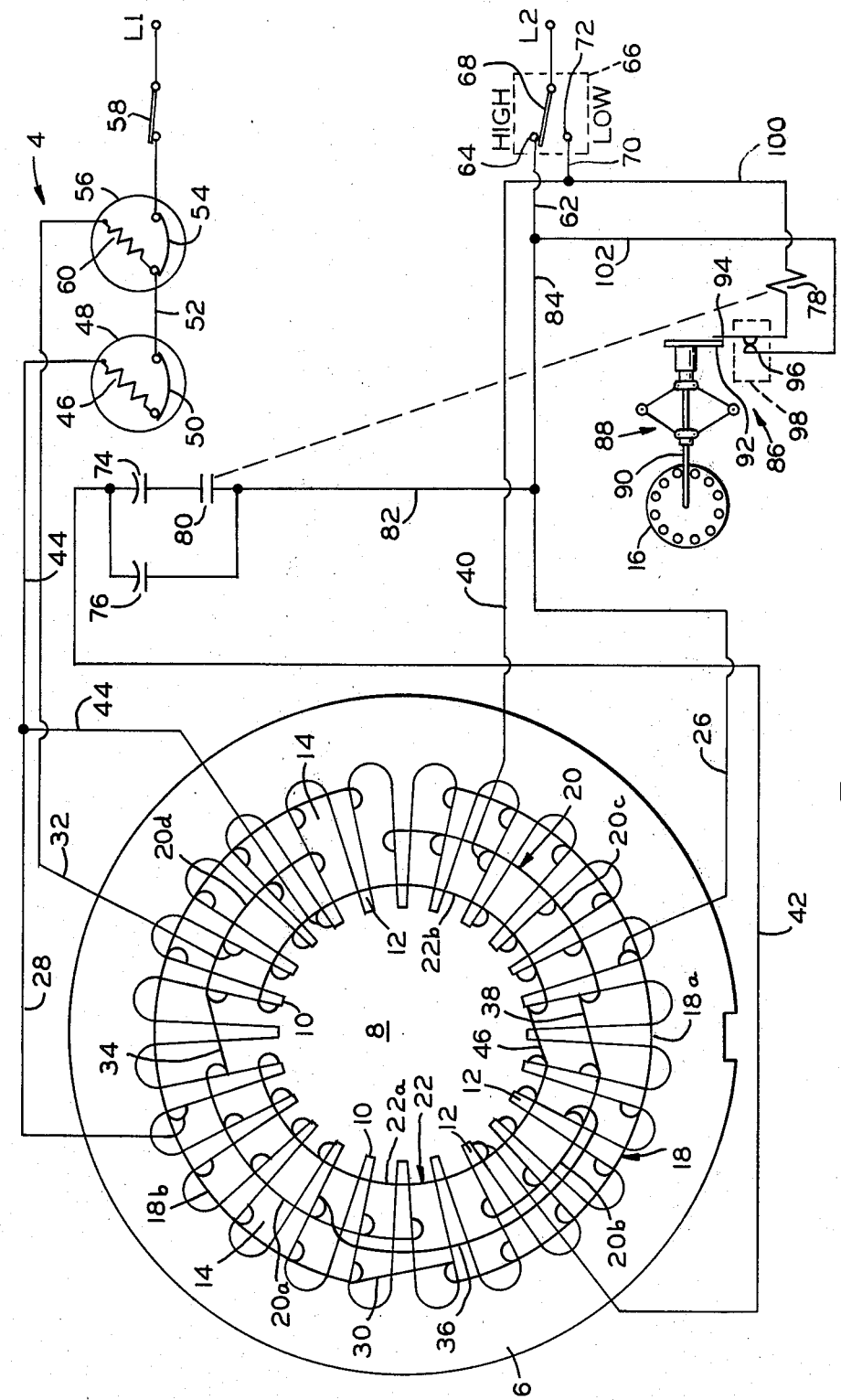
FIG. 1 is a schematic diagram of a motor embodying the invention in one preferred form thereof and connected in the high speed configuration.

Referring now in detail to the drawing, there is illustrated a motor 4 according to the present invention and comprising a slotted magnetic stator core 6 having a bore 8 extending through the center thereof with the bore 8 being defined by the tips 10 of a plurality of teeth 12. Teeth 12 define therebetween a plurality of slots 14 extending axially through stator core 6. A conventional squirrel cage rotor 16, which is shown in reduced size for clarity, is rotatably received within the bore 8 of stator 6 in a conventional fashion.

Motor 4 comprises main windings 18 and 20 and a start winding 22. High speed main winding 18, which is of a two pole configuration, comprises two symmetrical sets of windings 18a and 18b each comprising five coil groups wound around a plurality of teeth 12. The largest coil in each winding 18a and 18b encircles eleven teeth, the next largest coil nine teeth, the next largest coil seven teeth, the next largest coil five teeth, and the smallest coil encircles three teeth. Winding 18a is connected to lead 26, winding 18b is connected to lead 28, and windings 18a and 18b are connected together by wire 30.

Low speed main winding 20, which is of a four pole configuration, comprises four windings 20a, 20b, 20c and 20d, wherein windings 20a and 20c each comprise three coil groups, and windings 20b and 20d each comprise two coil groups. The largest coil groups in each of windings 20a and 20c are wound around six teeth 12, the next largest winding is wound around four teeth, and the smallest winding is wound around two teeth 12. The largest coil group in each of windings 20b and 20d is wound around four teeth 12, and the smallest coil group is wound around two teeth 12. Winding 20d is connected to lead 32 and is connected to winding 20a by wire 34, winding 20a is connected to winding 20b by wire 36, winding 20b is connected to winding 20c by wire 38, and winding 20c is connected to lead 40.

Start winding 22 comprises two symmetrical windings 22a and 22b each comprising four coil groups. The largest coil group in each winding 22a and 22b is wound around eleven teeth, the next largest coil group is wound around nine teeth, the next largest coil group is wound around seven teeth, and the smallest coil group is wound around five teeth 12. Winding 22a is connected to lead 42, winding 22b is connected to lead 44, and windings 22a and 22b are connected together by wire 46.

Lead 28 from high speed main winding 18 is connected by wire 44 to the heater element 46 of a conventional thermal line break device 48. The bimetallic element 50 of device 40 is connected by wire 52 to the bimetallic element 54 of line break device 56, which is connected through on/off switch 58 to terminal L1. Lead 32 from four pole low speed main winding 20 is connected to the heating element 60 of line break device 56, which is connected through bimetallic element 54 and on/off switch 58 to terminal L1. Line break devices 48 and 56, which are commonly used in motor protection circuits, sense the current flowing through the main windings 18 and 20, and when the heat generated by overcurrent conditions is sufficiently high, bimetallic elements 50 and 54 open to deenergize the motor circuit.

Lead 26 from high speed main winding 18 is connected by wires 84 and 62 to the high speed contact 64 of single pole double throw selector switch 66. The movable contact 68 of switch 66 is connected to the power supply terminal L2. Terminals L1 and L2 are adapted to be connected to a single phase power source. Lead 40 from four pole low speed winding 20 is connected by wire 70 to the low speed contact 72 of switch 66. The movable contact 68 of switch 66 is movable alternatively to high speed contact 64 and low speed contact 72 so as to connect these two contacts to terminal L2.

Lead 42 from start winding 22 is connected to start capacitor 74 and run capacitor 76. A conventional motor start relay comprising coil 78 and normally open contacts 80 is connected in the circuit such that normally open contacts 80 are in series with start capacitor 74. Run capacitor 76 is in parallel with the series connection of start capacitor 74 and relay contacts 80. The parallel connection of capacitors 76 and 74 and relay contacts 80 are connected to high speed terminal 64 of selector switch 66 by wires 82, 84 and 62.

A centrifugal switch 86 is utilized, either directly or indirectly, to disconnect start capacitor 74 from the circuit once running conditions have been reached. Switch 86 is illustrated only schematically and is not intended to portray any specific such device, although a wide variety of centrifugal switches for this type of application are readily available. Switch 86 comprises a centrifugal mechanism 88 which is connected to rotor 16 by shaft 90, and when a predetermined rotational speed of mechanism 88 has been reached, collar 92 will move axially against movable switch contact 94 to break the contact between it and stationary switch contact 96. In order to protect contacts 94 and 96 from sand, insects, water, and the like, a rubber boot indicated schematically at 99 may be provided.

It will be seen that relay coil 78 is connected in series between movable contact 94 of centrifugal switch 86 and the low speed contact 72 of selector switch 66 by wires 100 and 70. Stationary contact 96 of centrifugal switch 86 is connected by wires 102 and 62 to the high speed terminal 64 of switch 66. The effect of selector switch 66 is to connect centrifugal switch contacts 94 and 96 and relay coil 78 in series with terminal L2 with high speed main winding 18 and in series with start winding 22, which is in series with the parallel combination of capacitors 74 and 76 and contact 80, when selector switch 66 is in the low speed position. When switch 66 is in the high speed position, centrifugal switch contacts 94 and 96 and relay coil 78 are connected in series with the low speed main winding 20 and terminal L2. Thus, in the low speed position, when switch contacts 94 and 96 open, only low speed main winding 20 is activated. In the high speed position, high speed main winding 18 is activated and start winding 22 will remain in the circuit due to the presence of run capacitor 76. If capacitor 76 were removed, however, then start winding 22 would also be disconnected from the circuit.

The motor of FIG. 1 operates in the following manner. With selector switch 66 in the high speed position as illustrated, when off/on switch 58 is closed, current will begin to flow through relay coil 78 thereby immediately closing contacts 80 and connecting start capacitor 74 and run capacitor 76 in series with start winding 22 through lead 42. High speed main winding 18 is also connected in the circuit by lines 84 and 62. Low speed main winding 20 is connected to terminal L2 through lines 40, relay coil 78, switch contacts 94 and 96, line 102 and line 62.

When rotor 16 exceeds a predetermined rotational speed, centrifugal mechanism 88 will cause movable contact 94 to separate from stationary contact 96 thereby breaking the series connection with low speed main winding 20 and deactivating the same. At the same time, current ceases to flow through relay coil 78, and this causes normally open contacts 80 to open thereby breaking the series connection between start capacitor 74 and terminal L2. High speed main winding 18 remains activated, however, during the run condition of motor 4.

When the movable contact 68 of selector switch 66 is moved into engagement with contact 72, high speed main winding 18 is connected to terminal L2 through lines 26 and 102, centrifugal switch contacts 94 and 96, relay coil 78, line 100 and line 70. Low speed main winding 20 is connected to terminal L2 through lines 40 and 70, and start winding 22 is connected to terminal L2 through line 42, capacitors 76 and 74, relay contacts 80, lines 82, 84 and 102, switch contacts 94 and 96, relay coil 78, and lines 100 and 70. When rotor 16 exceeds the predetermined speed, centrifugal mechanism 88 opens switch contacts 94 and 96 thereby breaking the series connection between coil 78 and the parallel connection of capacitors 76 and 74 and start winding 22. Thus, only the low speed main winding 20 remains in the circuit during low speed run conditions.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed as new and is desired to be secured by Letters Patent of the United States is:

1. A multiple speed capacitor-start induction motor comprising: a stator core, a rotor rotatable within said core, a pair of terminals connectible to a source of excitation voltage, a high speed main winding wound on said core and connected across said terminals, a low speed main winding wound on said core and connected across said terminals, a start winding wound on said core and connected across said terminals, a start capacitor connected in series with said start winding, a single pole single throw centrifugally actuated switch means responsive to the rotational speed of said motor and having a pair of switch contacts which open when said rotor exceeds a predetermined speed, relay means comprising a coil in series with said switch contacts and having contacts in series with said start capacitor, double throw selector switch means having a high speed position and an alternative low speed position for connecting said centrifugally actuated switch means contacts in series with said low speed main winding and one of said terminals when in the high speed position and for connecting said centrifugally actuated switch means contacts in series with said high speed main winding and one of said terminals when in the low speed position, said relay means operating to open said relay contacts when current through said relay coil is interrupted by the opening of the series connected speed actuated switch contacts.

2. The motor of claim 1 wherein when said centrifugally actuated switch means contacts are closed during the start condition of the motor, both said main windings are connected across said terminals, and said centrifugally actuated switch means electrically disconnects said low speed main winding from one of said terminals when the predetermined rotor speed is exceeded if said selector switch means is in the high speed position.

3. The motor of claim 1 wherein when said centrifugally actuated switch means contacts are closed during the start condition of the motor, both said main windings are connected across said terminals, and said centrifugally actuated switch means electrically disconnects said high speed main winding from one of said terminals when the predetermined rotor speed is exceeded if said selector switch means is in the low speed position.

4. The motor of claim 1 wherein said centrifugally actuated switch means is mechanically connected to said rotor and is responsive directly to the rotational speed of said rotor to open its contacts when the predetermined rotor speed is exceeded.

5. The motor of claim 1 wherein said selector switch means comprises a single pole double throw switch.

6. The motor of claim 1 including a run capacitor connected in series with said start winding and one of said terminals.

7. The motor of claim 1 including a run capacitor connected in parallel with the series connection of said start capacitor and said relay contacts.

8. The motor of claim 7 wherein said run capacitor is connected in series with said start winding.

9. The motor of claim 1 including a first overload line break device connected in series with one of said main windings and one of said terminals, and a second overload line break device connected in series with one of said terminals and the other of said main windings.

10. The motor of claim 1 wherein said low speed winding is of a larger pole configuration than said high speed winding.

11. The motor of claim 10 wherein said low speed winding is a four pole winding and said high speed winding is a two pole winding.

12. The motor of claim 10 wherein said start winding has the same number of poles as said high speed winding.

13. The motor of claim 1 wherein said relay contacts are normally open contacts.

* * * * *